Patented Sept. 13, 1949

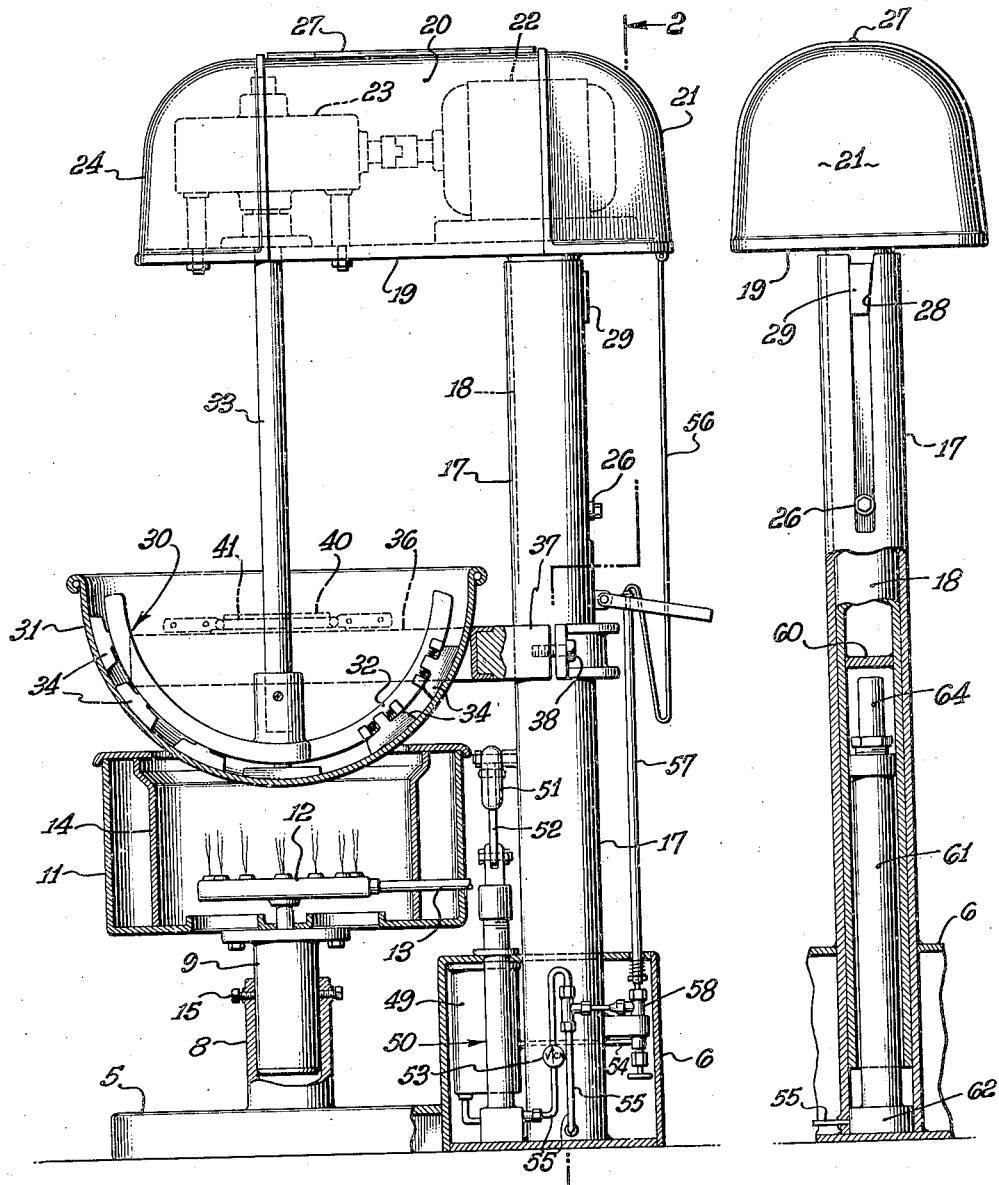

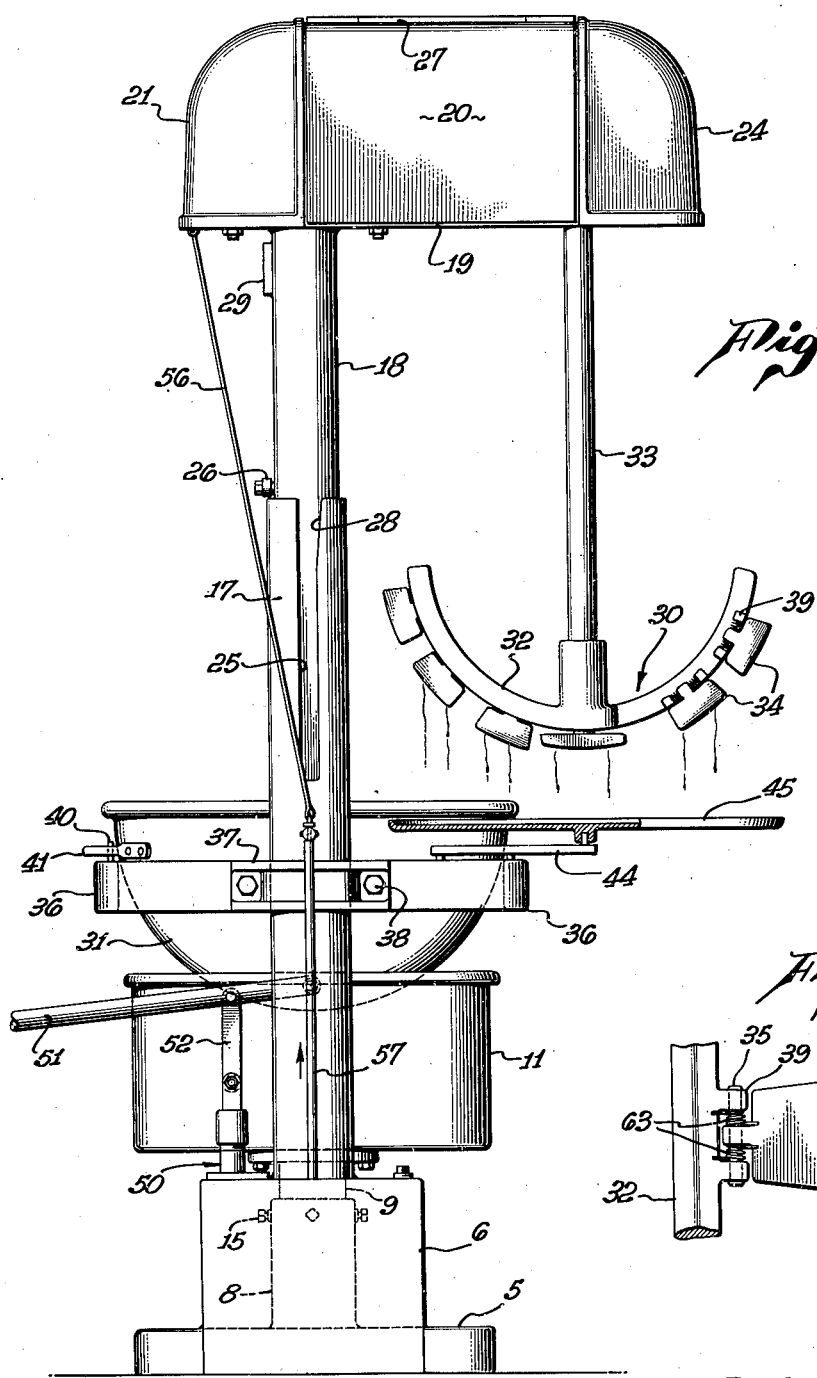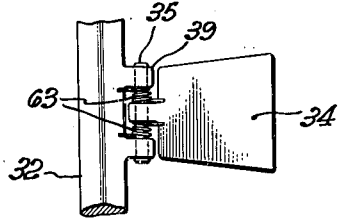

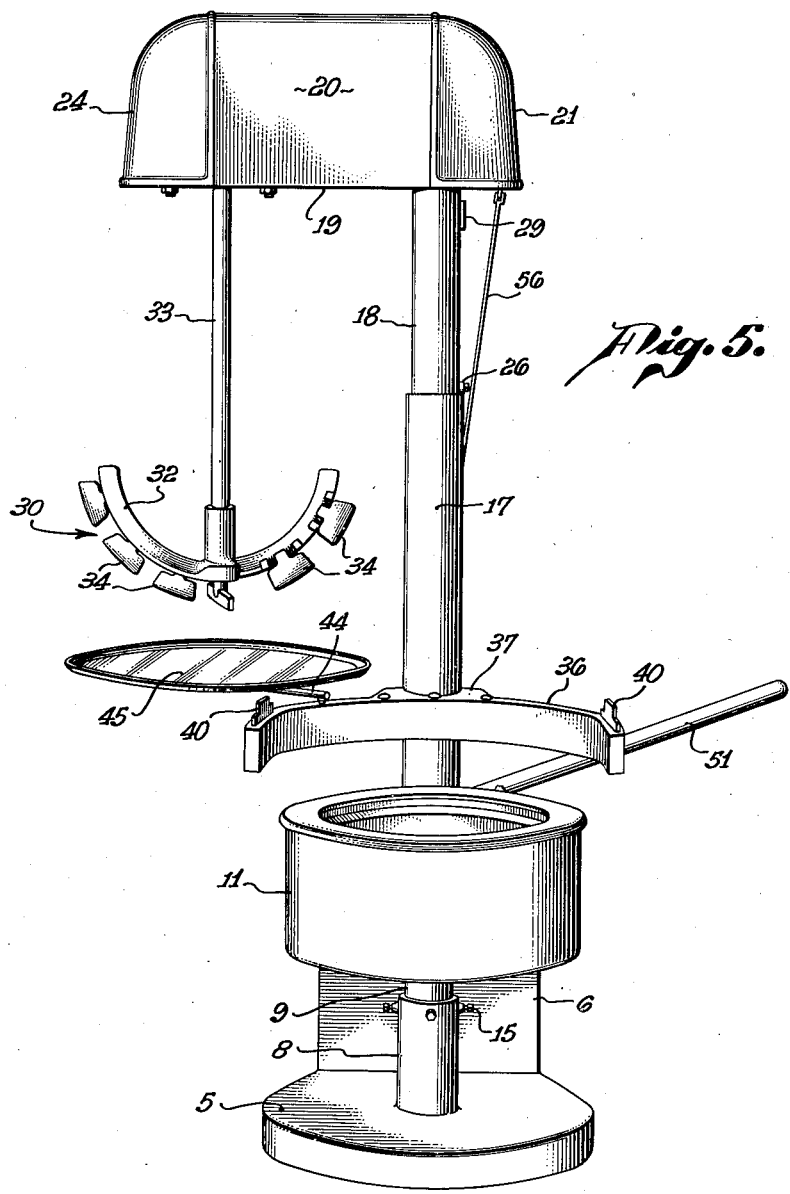

2,481,731

UNITED STATES PATENT OFFICE 2,481,731

MIXER

Rubin M. Dubin, Los Angeles, Calif.

Application July 1, 1946, Serial No. 680,810

11 Claims. (Cl. 259—108)

This invention relates to culinery apparatus, and particularly to a candy making machine or mixer.

Candy mixers, wherein a motor driven paddle, stirrer, or agitator is adapted to be raised and lowered into a kettle over a furnace, are well-known, as evidenced by U. S. Patent No. 1,091,022 of March 24, 1914, and U. S. Patent No. 1,162,811 of December 7, 1916. The present invention is an improvement over prior candy making machines of this type by providing hydraulic lifting of the agitator, whereby it is easily and quickly raised out of the kettle, provision being made for its translation from its position over the kettle to a position over a drip pan. In this manner, the kettle may be easily and quickly removed from its supporting yoke without interference from the agitator. Furthermore, although prior machines have provided means for lifting the paddle out of the kettle to facilitate removal of the kettle, the paddle has remained over the furnace so that the drippings therefrom have fallen into the furnace and have burned, causing general inconvenience. Some mixers provide a separate pan to slide under the agitator after the kettle is removed, but this is not always used, and even when used, some drippings always fall into the hot furnace.

The principal object of the invention, therefore, is to facilitate the mixing of ingredients for candy or other foods.

Another object of the invention is to provide an improved method of and machine for mixing candy or other food ingredients.

A further object of the invention is to provide a candy making machine which is hydraulically operated and adapted to facilitate the removal of the kettle containing the candy or food after mixing.

A still further object of the invention is to provide a hydraulically operated candy machine adapted to remove the agitator from above the cooking furnace.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a cross-sectional view of a candy making machine embodying the invention.

Fig. 2 is a cross-sectional view taken along the line 2—2 of Fig. 1.

Fig. 3 is a rear view of the machine showing the agitator in inoperative position.

Fig. 4 is a detailed view of one of the scrapers of the stirrer or agitator, and Fig. 5 is a general perspective view of the candy machine of the invention.

Referring now to the drawings, in which the same numerals refer to like elements, the machine is mounted on a base 5 connected to a casing 6 housing a hydraulic pump. A cylindrical standard 8 extends upwardly from the base 5 and in which is positioned a supporting post or standard 9 for supporting a furnace including an outer casing 11 and a burner 12 having a feed pipe 13. An inner casing 14 provides a cooling chamber between it and casing 11. By means of set screws 15, the furnace is adjustable as to height.

Extending into the housing 6 is a tubular post or standard 17 with a tubular telescopic inner post or standard 18 for supporting a platform 19 on which is mounted a motor 22 and a set of reduction gears 23. The gears are encased in oil for quiet operation. The motor and gear box are covered with a hood having ends 21 and 24 bolted to the platform 19 and a center section 20 hinged at 27 for quick access to the interior.

The outer sleeve 17 of the supporting standard has a longitudinal notch 25 therein in which a roller guide 26 attached to inner standard 18 is accommodated when a paddle or agitator 30 is in operative position in a kettle 31. The upper end 28 of the slot 25 is tapered to accommodate a wedged-shaped lug 29 attached to sleeve 18 to hold the agitator at a fixed position in the kettle during the mixing operation. When the roller 26 is in the position shown in Fig. 3 and resting on the edge of standard 17, the agitator 30 is above the kettle 31 and may then be rotated substantially ninety degrees from its operative position. By guiding the agitator into the kettle by roller 26, cutting of the kettle by scrapers 34 is prevented. The agitator 30 is driven by the motor 22 through the reduction gears 23, the agitator being mounted on the lower end of a shaft 33. The agitator 30 has a semi-circular arm 32 on which are mounted spring tensioned scrapers 34, one of which is shown in detail in Fig. 4, the scrapers being arranged to cover the entire inner surface of the kettle. The paddle 34 is under tension of springs 63 around a shaft 35 mounted on ears 39.

Mounted on the sleeve 17, is a yoke 36 held by a split collar 37 and bolts 38. In this manner, the yoke is vertically adjustable along the length of the sleeve 17 to properly position the kettle with respect to the agitator. The yoke 36 supports the kettle 31 above the furnace, the height of the furnace being adjustable by screws 15 as mentioned above. Adjacent the ends and diametrically opposite each other on the yoke 36 are two lugs 40 over which the handles 41 of the kettle are positioned to hold the kettle in place over the furnace.

Mounted on an arm 44 having one end attached to the yoke 36, is a drip pan 45 with a raised rim adapted to receive the drippings from the stirrer 30 when the stirrer is in the position shown in Fig. 3. The drippings from the scraper 34, therefore, do not fall into the furnace, burn, stick, and produce disagreeable odors, the drip pan being easily removable for cleaning. It is to be noted that in the making of candy confections, the mixture is required to be mixed a predetermined length of time at a definite temperature, and should be removed immediately from the kettle at the critical point in its manufacture. With the present machine, this can be readily accomplished simply by raising the stirrer and swinging it to one side, making removal of the kettle very efficacious.

As mentioned above, the raising of the platform 19 with its supported elements and the stirrer 30, is accomplished hydraulically. In the casing 6, is a hydraulic pump 50 with its storage tank 49, the pump containing a piston operated by a lever 51 through a linkage 52. Within tube standard 18, is welded a plate 60 below which is a cylinder 61 having a lower collar 62 with an opening therein. By pumping air or oil into the piston 61 through pipes 55, the piston 64 is raised against plate 60 which lifts the inner standard 18 to a position wherein the guide 26 is above the upper edge of the standard 17. At this point, after de-energization of the motor, the shaft 33 may be grasped and rotated so that the agitator 30 is above the drip pan 45. A check valve 53 in the pipe will hold the platform 19 and the elements supported thereby in elevated position during the rotation thereof.

To prevent the standard 18 and its supporting elements being raised above safe limits, a cord or chain 56 is attached to the platform 19 and to a valve control rod 57. Upward movement of the control rod opens the release valve 58 to by-pass the hydraulic fluid back to tank 49 through pipe 54, which prevents further upward movement of the stirrer and its associate structure. When this point is reached, the agitator is rotated over the drip pan. To lower the agitator into the pan 31, the shaft 33 is rotated back to where the guide roller 26 enters the slot 25, the valve 58 then being hand actuated by the cord 56.

From the above description, the candy machine has several salient features, such as the hydraulic lifting of the motor, gears, and agitator portions of the machine, this latter portion being quickly raised at the critical cooking point of the candy. The agitator may then be translated to a position above the drip pan, preventing the mixture adhering to the agitator from falling into the furnace. Also, a safety feature is provided to prevent excessive raising of the super structure of the machine.

I claim:

1. A mixer comprising a base, a tubular standard mounted on said base, said standard having a longitudinal groove therein open at one end, a second standard telescopically mounted within said tubular standard, said second standard having a guide member attached thereto for movement in said groove, a locking member on said second standard for holding said standards in fixed positions relative to one another, power means mounted on the upper end of said second standard, an agitator adapted to be rotated by said power means, and means for hydraulically raising and lowering said second standard for lifting and lowering said agitator, said guide member moving in said groove during the raising and lowering operations, said locking member entering said groove when said second standard is in lowered position, said second standard being adapted to be rotated within said tubular standard for translating said agitator about said standard, said guide member moving on the edge of said tubular standard during the rotation of said second standard.

2. A mixer comprising a base, a hollow standard having an open ended groove in the upper portion thereof, a yoke mounted on said standard, a kettle supported by said yoke in a predetermined fixed position, a second standard telescoping within said hollow standard, a guide member on said second standard movable in said groove, a motor and gear train mounted on the upper end of said telescopic standard, an agitator connected to said gear train and adapted to be rotated in said kettle by said motor, said guide member guiding said agitator to a predetermined position in said kettle, hydraulic means for raising said motor, a pan, gear train, and agitator to a position above said kettle, said motor, gear train, and agitator being adapted to be rotated about said standards, said guide member contacting the upper edge of said hollow standard for maintaining said agitator in elevated position when rotated over said pan, and a locking member on said second standard for locking said standards in a fixed position relative to one another for maintaining said agitator in a predetermined stirring position in said kettle.

3. A mixer in accordance with claim 2, in which means are connected between said second standard and said hydraulic means for making said hydraulic means inoperative at a predetermined height of said agitator.

4. A mechanism for rapidly removing the agitator of a mixer from a mixing kettle comprising a hollow standard, a second standard supporting said agitator in said kettle and adapted to be hydraulically raised and lowered within said hollow standard, a pump for pumping fluid under said second standard, a valve for releasing said fluid from said second standard to lower said second standard, and interacting guiding means between said standards for guiding said agitator in and out of said kettle, said guiding means permitting rotation of said second standard by separation of the elements of said interacting guiding means when said second standard and said agitator have reached a predetermined height, one element of said guiding means maintaining said second standard and said agitator at said height.

5. A mechanism in accordance with claim 4, in which means are connected to said second standard and said valve for releasing said fluid when said second standard has reached said predetermined height.

6. In a mixer having a kettle fixedly positioned and an agitator adapted to be raised and lowered into said kettle and rotated at a predetermined position therein, the combination of a fixed tubular standard having an open top end, a second standard within said tubular standard, said second standard supporting said agitator, a motor supported by said second standard and adapted to rotate said agitator, a hydraulic pump for pumping a fluid under said second standard to raise it rapidly, guide means having contacting elements on said standards for maintaining said standards in fixed positions rotationally during raising of said second standard to a predetermined height, said contacting elements of said guide means separating at said predetermined height to permit rotation of said second standard at said predetermined height, one element of said guiding means contacting the open top of said fixed standard for maintaining said second standard at said height, and valve means for preventing the raising of said second standard by said pump beyond a predetermined height.

7. A mixer in accordance with claim 6, in which said elements of said guide means includes a guide member attached to said second standard and a downwardly extending groove in the upper portion of said tubular member for accommodating said guide member, a second member being attached to said second standard for locking said standards when said agitator is in proper position in said kettle.

8. A mixer for mixing comparatively large quantities of ingredients comprising a base, a tubular standard on said base, a kettle fixedly positioned with respect to said tubular standard, a second standard adapted to be raised and lowered with respect to said tubular standard, an agitator carried by said second standard and adapted to be moved in and out of said kettle as said second standard is lowered and raised, respectively, interacting guiding means on said standards for guiding said agitator in a straight line path in and out of said kettle, said means maintaining said agitator at a predetermined height above said kettle, the elements of said guiding means separating to permit movement of said agitator in a direction from above said kettle perpendicular to said straight line path.

9. A mixer in accordance with claim 8, in which said interacting guiding means includes a projecting lug attached to said second standard, and a groove extending downwardly from the upper end of said tubular standard, movement of said agitator from above said kettle being permitted when said lug passes out of said groove, said lug contacting the upper end of said tubular standard to maintain said agitator in a raised position.

10. A mixer in accordance with claim 8, in which power means are provided for raising said second standard and said agitator, a connecting link between said power means and said second standard controlling the height to which said power means raises said second standard.

11. A mixer in accordance with claim 9, in which a second projection lug is attached to said second standard for locking said agitator in a predetermined lowered rotational position within said kettle.

RUBIN M. DUBIN.

REFERENCES CITED

The following references are of record in the file of this patent:

UNITED STATES PATENTS

| Number | Name | Date |
|---|---|---|
| 1,151,295 | Schlueter | Aug. 25, 1915 |
| 1,325,190 | Chodak | Dec. 16, 1919 |
| 1,598,400 | Simmonds | Aug. 31, 1926 |